M. H. HANSEN.
WEIGHING SCALE AND OTHER MEASURING INSTRUMENT.
APPLICATION FILED FEB. 21, 1914.
1,141,629.
Patented June 1, 1915.
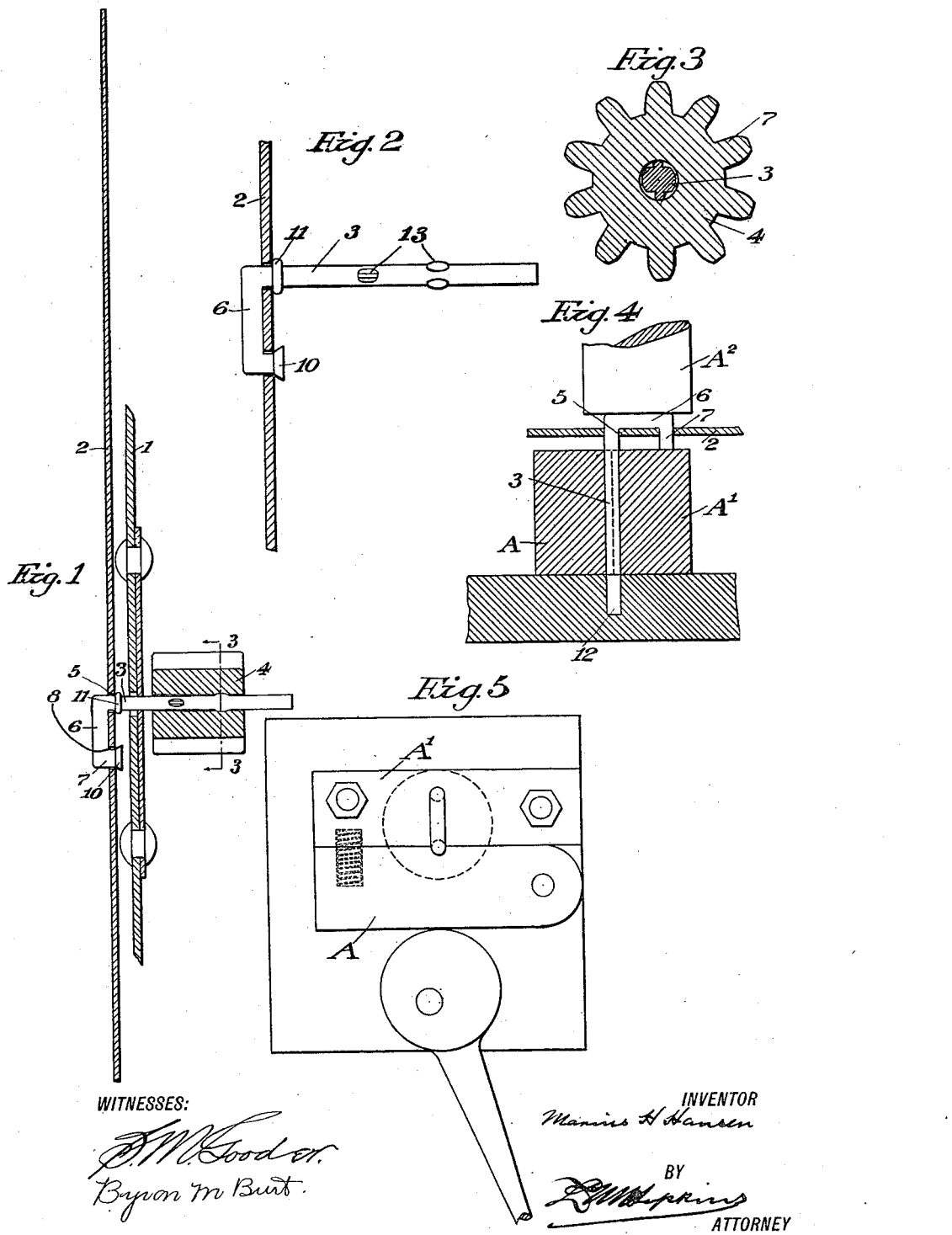

UNITED STATES PATENT OFFICE.

MARIUS H. HANSEN, OF CHICAGO, ILLINOIS.

WEIGHING-SCALE AND OTHER MEASURING INSTRUMENT.

1,141,629.  Specification of Letters Patent.  Patented June 1, 1915.

Application filed February 21, 1914. Serial No. 820,220.

*To all whom it may concern:*

Be it known that I, MARIUS H. HANSEN, a citizen of the United States, residing at Chicago, in the county of Cook and State of Illinois, have invented certain new and useful Improvements in Weighing-Scales and other Measuring Instruments, of which the following is a specification.

In all measuring instruments accuracy is, of course, of prime importance, and in delicate instruments using a pointer or index hand stability of connection between parts and the minimizing of friction are important factors. To be more specific, in a weighing scale having a pointer, accuracy is promoted by making a positive, absolutely firm, non yielding connection between the pointer shaft and the other parts that move with it, and friction is minimized by making the shaft of minimum diameter, compatible with the necessary strength, and this minimizing of the diameter of the shaft also permits of the minimizing of the diameter of the pinion which it carries and through which it derives its motion, with a consequent reduction of friction in the teeth of the gearing and in the weight of the pointer-shaft pinion.

With these ends in view the invention relates to the means for connecting the pointer-shaft with its pinion and with the pointer, and the object of the invention is to provide improved means for making these connections, to the end that these connections shall be absolutely rigid, and of such construction that they enable the use of a shaft and pinion of smaller diameter than are customarily used.

The invention consists in the features of novelty that are hereinafter described with reference to the accompanying drawing which is made a part of this specification and in which;

Figure 1 is a section of so much of a weighing scale embodying the invention as is necessary to illustrate one of its practical applications. Fig. 2 is a side elevation, on an enlarged scale, for an arrangement for forming a rigid connection with the pointer and of the pointer shaft showing its condition after treatment before being inserted in the bore of the pinion. Fig. 3 is a section on the line 3—3, Fig. 1, looking in the direction of the arrows. Fig. 4 is a sectional elevation illustrating the process of tightening the connection between the pointer and its shaft and the dies used therein. Fig. 5 is a plan view of the lower die members.

For the purposes of illustrating the invention I have shown its embodiment in a scale of the general type of construction shown in my former Patent No. 612,968, dated October 25, 1898, but I desire to have it understood that I reserve to myself the exclusive right to use the invention in any type of scale or other measuring instrument in which it may be found to be useful.

As shown in the drawing, 1, represents a dial plate which may be calibrated in any desired manner to meet particular requirements. The pointer, or index finger, is shown at 2, its shaft at 3, and the pinion carried by the shaft and through the medium of which the shaft derives its motion at 4. The shaft, 3, passes directly through an opening, 5, formed through the pointer and terminates at its upper end in a laterally projecting portion, 6, which is perpendicular to the axis of the shaft, and has at its extremity a short lateral projection, 7, which is perpendicular to the laterally projecting portion, 6, and parallel with the shaft, the whole being formed of a slender but strong piece of wire of round cross-section, bent at right angles, twice in the same direction, to the form of the letter L. In addition to the perforation, 5, through which the shaft passes with a tight fit, the pointer has a perforation, 8, through which the lateral projection, 7, passes, so that it projects slightly beyond the inner surface of the pointer, its extremity being upset or riveted as shown at 10, whereby an absolutely rigid connection is made between the pointer and the several parts accessory to its shaft.

In assembling the parts, the shaft is passed through the perforation, 5, from the outside of the pointer, and the projection, 7, is then passed through the perforation, 8, until the lateral projection, 6, comes to a firm bearing against the outer surface of the pointer, as shown in Fig. 4. The shaft is then clamped between two die members, A and A', with the extremity of the lateral projection, 7, resting upon the die member A, a third die member A², in the nature of a hammer is then brought down, with sufficient force for its purpose, upon the lateral projection, 6, and this upsets or rivets the end of the lateral projection, 7, as shown at 10. At the same time this action of the dies expands the shaft within and immediately below the perforation, 5, thereby causing a tight fit, and also causing the portion adjacent to the inner surface of the pointer, to swell or enlarge, thus forming a slight shoulder, 11.

All parts and features of the device are more or less exaggerated in the drawing, for the sake of greater clearness. The forming of this shoulder, 11, is facilitated by the tight clamping of the shaft between the die members, A and A', and the resting of the lower end of the shaft upon a fixed anvil pin, 12.

The foregoing operations with the parts constructed as shown and described make an absolutely rigid connection between the pointer and its shaft and after this is done the shaft is subject to the action of dies, between which it is pinched to form radial fins, 13, which are elongated in the direction of the length of the shaft and extend radially outward a short distance beyond the circumference of the shaft. Furthermore, the lower sides of these fins are sloped, or graduated in height, so that when the end of the shaft is inserted in the central bore of the pinion, 7, and sufficient pressure is exerted upon the upper end of the shaft, the pinion, 7, being meanwhile supported as against this pressure, the fins will be forced into the opening of the pinion and more or less mashed down as the pressure proceeds, thus forming an absolutely rigid friction connection between the shaft and the pinion.

I am, of course, aware that rigid friction joints have been formed by forcing a shaft into a bore in another part, the bore and shaft being of substantially the same diameter, but this requires greater end-wise pressure upon the shaft than is necessary with a shaft provided with radial fins as above described, and this is important where the shaft is of small diameter, as it lessens the tendency to bend it.

What I claim as new is:

1. A device of the class described, having a pointer having through it two perforations, a shaft passing through one of said perforations with a tight fit, a portion projecting laterally from the end of the shaft and lying against the surface of the pointer and a second portion projecting laterally from the portion last aforesaid and passing through the second perforation of the pointer with a tight fit.

2. In a device of the class described, the combination of a pointer having through it two perforations, a shaft passing through one of said perforations with a tight fit, a portion projecting laterally from the end of the shaft and lying against one surface of the pointer, a shoulder on the shaft lying against the opposite surface of the pointer, a portion projecting laterally from the laterally projecting portion first aforesaid and passing through the second perforation of the pointer with a tight fit, the extremity of the last named laterally projecting portion being upset or riveted against the surface of the pointer.

MARIUS H. HANSEN.

Witnesses:
HARRY W. MONS,
L. M. HOPKINS.

Copies of this patent may be obtained for five cents each, by addressing the "Commissioner of Patents, Washington, D. C."